United States Patent [19]

Sanders

[11] 4,094,695

[45] June 13, 1978

[54] PLASTICIZED CELLULOSE ESTER COMPOSITIONS

[75] Inventor: Robert R. Sanders, Kingsport, Tenn.

[73] Assignee: Eastman Kodak Company, Rochester, N.Y.

[21] Appl. No.: 711,923

[22] Filed: Aug. 5, 1976

[51] Int. Cl.² ............................................. C08L 1/10
[52] U.S. Cl. .................................. 106/179; 106/178; 106/180; 106/182; 106/183; 106/191
[58] Field of Search ............... 264/200; 106/178, 180, 106/181, 189, 196, 191, 188, 179, 182, 183

[56] References Cited

U.S. PATENT DOCUMENTS

| | | | |
|---|---|---|---|
| 2,261,140 | 12/1941 | Conklin et al. | 106/178 |
| 2,406,658 | 8/1946 | Bogin | 106/178 |
| 2,454,274 | 12/1948 | Daly et al. | 106/180 |
| 2,925,352 | 2/1960 | Lowe | 106/181 |

*Primary Examiner*—Lorenzo B. Hayes
*Assistant Examiner*—W. Thompson
*Attorney, Agent, or Firm*—J. Frederick Thomsen; Daniel B. Reece, III

[57] ABSTRACT

Molded articles and films prepared from plasticized esters of cellulose and carboxylic acids, particularly plasticized cellulose acetate butyrate, exhibit good toughness when certain poly(alkylene glycols) and esters thereof are employed as the plasticizer.

11 Claims, No Drawings

PLASTICIZED CELLULOSE ESTER COMPOSITIONS

This invention relates to certain novel cellulose ester compositions and, more particularly, to certain molding and film-forming cellulose esters plasticized with poly(alkylene glycols).

A wide variety of cellulose esters have been employed in formulating thermoplastic molding and film-forming compositions. An essential component of cellulose ester molding and film-forming compositions is a plasticizer which imparts impact strength and flexibility to molding articles and films derived therefrom. The plasticizers most commonly used include esters of aliphatic dicarboxylic acids such as dioctyl adipate, dioctyl azelate and dibutyl sebecate; esters of aromatic dicarboxylic acid such as diisobutyl phthalate and dioctyl phthalate; and esters of aromatic tricarboxylic acid such as trioctyl trimellitate. The use of these commonly used plasticizers in many applications causes problems because of their volatility or lack of permanence. For example, during the manufacture of molded articles and films from cellulose esters the heat used in the molding or extrusion causes a significant amount of the plasticizer to volatilize. This loss of plasticizer can result in the molded or extruded article having poor toughness, i.e. relatively low impact strength and flexibility.

Replacement of the above-mentioned plasticizers with esters having improved permanence has been difficult because such replacements either did not impart sufficient toughness to molded articles or films of cellulose esters or the economics were not acceptable. Thus, the difficulty in finding a plasticizer possessing the necessary properties has limited the use of cellulose esters in the manufacture of many articles where toughness and/or permanence are essential.

I have discovered that certain poly(alkylene glycols) and esters thereof are excellent plasticizers for carboxylic acid esters of cellulose. The poly(alkylene glycols) and their esters, being of relatively high molecular weight, exhibit improved permanence when incorporated into cellulose esters according to conventional techniques. Of equal importance is the excellent toughness which the poly(alkylene glycols) and their esters impart to cellulose esters. For certain end uses such as powder coating compositions based on plasticized cellulose acetate butyrate, the use of poly(alkylene glycols) and their esters as the plasticizer increases significantly the cryogenic grinding rate. Also, such powders can be blended readily with various colorants to prepare colored powder coating compositions without the necessity of melt compounding.

The present invention, in its broader aspects, concerns a molding and film-forming cellulose ester in which the cellulose ester consists essentially of an ester of cellulose and one or more carboxylic acids containing from 2 to 4 acids, which cellulose ester contains a plasticizing amount of a poly(alkylene glycol), or ester thereof, which is derived from ethylene glycol, propylene glycol, tetramethylene glycol or combination thereof and has a molecular weight of about 800 to 1200. Another aspect of the invention concerns such a plasticized molding and film-forming cellulose ester wherein the ester consists essentially of cellulose acetate butyrate. A third and narrower aspect of the invention concerns a powder coating composition in which the film-forming constituents consist essentially of a plasticized cellulose acetate butyrate in which the plasticizer is the above-described poly(alkylene glycol) or an ester thereof.

The esters of cellulose and one or more carboxylic acids containing 2 to 4 carbon atoms useful in preparing the novel compositions of this invention are well-known. See, for example, *High Polymers*, Vol. 5, 2nd Ed., p 766, Interscience Publishers, Inc., New York (1963). The most important of these esters are cellulose acetate, cellulose acetate propionate and cellulose acetate butyrate which contains some free hydroxyl. Such esters are described in Publication No. E-170 and other technical literature available from Eastman Chemical Products, Inc.

The poly(alkylene glycols) useful in preparing the novel compositions of my invention are (1) poly(tetramethylene glycol), (2) a poly(alkylene glycol) copolymer in which 10 weight percent or less is made up of units derived from ethylene oxide and the remainder is made up of units derived from propylene oxide, and (3) poly(propylene glycol), each of such poly(alkylene glycols) having a molecular weight of about 800 to 1200. The poly(alkylene glycol) esters which can be used as esters of the above described poly(alkylene glycols) and a monocarboxylic acid containing about 2 to 8 carbon atoms and in which essentially all of the hydroxyl groups have been esterified. Examples of such acids include acetic, propionic, butyric, caproic and 2-ethylhexanoic acids. I have found that the substitution of a poly(alkylene glycol) ester for the corresponding unesterified poly(alkylene glycol), particularly those derived from ethylene and/or propylene glycol, in the novel cellulose ester compositions improves the moisture resistance of the compositions.

In describing the poly(alkylene glycols) as derivatives of certain glycols it is intended to define the polymer as consisting primarily of repeating oxyalkylene units and is not a limitation on the method by which the polymer is made. It is to be understood that the poly(alkylene glycols) may be prepared from certain oxides such as ethylene and propylene oxides. The molecular weight range is important since poly(alkylene glycols) having a molecular weight below about 800 are generally water soluble and impart moisture sensitivity to coatings and/or molded plastics, whereas poly(alkylene glycols) above about 1200 will render moldings and films of cellulose ester plasticized therewith brittle. Although various poly(alkylene glycols) and their esters which are useful in practicing the invention can be made by well-known techniques, suitable poly(alkylene glycols) and esters thereof are commercially available from a number of sources and were used in preparing the specific novel compositions described hereinbelow. Poly(propylene glycol) having a molecular weight of about 1000 and its diacetate ester are especially preferred as the plasticizer component of our novel cellulose ester compositions because of their cost and because moldings and coatings prepared from poly(propylene glycol) and poly(propylene glycol) diacetate plasticized compositions exhibit superior moisture resistance.

The amount of plasticizer present in the novel cellulose ester composition can vary substantially depending, for example, on the particular cellulose ester and poly(alkylene glycol) or ester thereof that are used. Generally, moldings and coatings having acceptable properties can be prepared from powder coating compositions in which the plasticizer is present in a concentration of about 5 to 30 phr. (weight parts per one hundred weight parts resin, i.e., cellulose ester) while for most end used best results are obtained when the composition contains about 7.5 to 25 phr plasticizer.

Conventional stabilizers, such as resorcinol monobenzoate, Irganox 1093 (product of Ciba-Geigy) or Goodrite 3114 (product of B. F. Goodrich Chemical Co.), may be used in small amounts to prevent degradation, discoloration, etc. Also, conventional dyes and/or pigments such as titanium dioxide may be used.

As has been indicated hereinabove, a preferred embodiment of the present invention is a cellulose acetate butyrate containing a plasticizing amount of certain poly(alkylene glycols), i.e. those poly(alkylene glycols) discussed hereinabove, and their esters. Such compositions are particularly useful in applications where good impact strength and/or flexibility are required such as, for example, in sheeting, wire coatings and films. Typical cellulose acetate butyrates that may advantageously be plasticized with the described poly(alkylene glycols) and their esters have a viscosity of about 0.2 to 40 seconds, an acetyl content of about 2 to 30 percent, a butyryl content of about 17 to 53 percent and a hydroxyl content of about 0.5 to 5 percent when measured by ASTM Method D-817-64 using Formula A for viscosity. For the reasons set forth above, i.e. cost and performance, the preferred plasticizer for the cellulose acetate butyrate compositions is poly(propylene glycol) and its diacetate ester.

Another preferred embodiment of the invention is a thermoplastic coating composition in the form of a powder having an average particle size of between about 10 and 300 microns in which the film-forming ingredient consists essentially of a cellulose acetate butyrate which is plasticized with the poly(alkylene glycols) and esters thereof described above. Such coating compositions desirably fuse at a temperature of about 350° F. or higher over a period of 10 minutes, do not smoke during fusion, and give coatings or films 1 to 7 mils thick having excellent appearance and physical properties. Analogous powder coating compositions containing dioctyl phthalate as the plasticizer give fused coatings having good appearance but low impact strength, e.g. 40/4 in.-lb., front reverse, and poor flexibility. Dioctyl phthalate and other conventional plasticizers are sufficiently volatile at powder fusion temperatures that a significant amount is lost during fusion. In addition to having low volatility at fusion temperatures, the use of a poly(alkylene glycol) or its ester as the plasticizer in cellulose acetate butyrate powder coating compositions imparts improved impact strength and flexibility to coatings or films prepared therefrom. Another advantage is that poly(alkylene glycol) and poly(alkylene glycol) ester-plasticized compositions generally have a significantly greater cryogenic grinding rate than do formulations containing dioctyl phthalate.

As mentioned above, in my novel thermoplastic powder coating composition the film-forming ingredient consists essentially of a plasticized cellulose acetate butyrate. Thus, coating compositions containing substantial amounts of other resinous or polymeric compounds, such as acrylics and polyesters, which can be used by themselves as coating or film-forming compositions, are not within the scope of the coating compositions of this invention. However, the coating compositions can contain significant amounts of polymeric materials which function as modifiers for coating compositions, e.g. flow aids and adhesion promoters.

The cellulose acetate butyrates described hereinabove are representative of those which may be used in preparing the novel powder coating compositions. The cellulose acetate butyrates that are preferred for the powder coating composition of this invention have a viscosity of about 0.5 to 2.0, an acetyl content of about 2-20 percent, a butyryl content of about 30 to 50 percent and a hydroxyl content of about 0.5 to 5.0 when measured as described above. A cellulose acetate butyrate that is especially useful has a viscosity of about 0.3 to 0.5 seconds, an acetyl content of about 13.5 percent, a butyryl content of about 37 percent and a hydroxyl content of about 1.5 percent.

The amount of plasticizer present in the powder coating composition can vary substantially depending, for example, on the particular cellulose acetate butyrate CAB and poly(alkylene glycol) or ester thereof that are used. Generally, coatings having acceptable properties can be prepared from powder coating compositions in which the plasticizer is present in a concentration of about 5 to 30 phr. While best results usually can be obtained when the composition contains about 15 to 25 phr plasticizer.

Conventional additives such as stabilizers, dyes, pigments and/or fillers such as barium sulfate may be and generally are present in the composition. The smoothness and gloss of coatings made from the powder coating composition frequently can be improved if the composition contains a small portion of an acrylic flow aid. Such flow aids are polymers of an alkyl acrylate or an alkyl methacrylate or are copolymers of an alkyl acrylate and an alkyl methacrylate, wherein the alkyl group has 2 to 8 carbon atoms, the polymer or copolymer has a molecular weight of about 3,000 to 20,000 and the copolymer consists of 20 to 80 mole percent methacrylate monomer and 80 to 20 percent acrylate monomer. Examples of such acrylic polymers and copolymers include poly(isobutyl acrylate), poly(2-ethylhexyl acrylate), poly(isobutyl methacrylate), poly(2-ethylhexyl methacrylate), poly(ethyl acrylate/2-ethylhexyl methacrylate), poly(ethyl methacrylate/2-ethylhexyl methacrylate), poly(isobutyl acrylate/2-ethylhexyl acrylate), poly(isobutyl methacrylate/2-ethylhexyl acrylate) and poly(isobutyl acrylate/isobutyl methacrylate).

A preferred acrylic flow aid is a copolymer of about 60 mole percent 2-ethylhexyl methacrylate and about 40 mole percent ethyl acrylate having a molecular weight of about 17,000. Such a copolymer is available as MODAFLOW Resin Modifier sold by Monsanto Company.

The amount of acrylic flow aid which will give optimum results will depend primarily on the amount of epoxy resin that is present in the power coating composition. Generally, about 0.5 to 3 phr will cause a noticeable improvement in the quality of the coating produced by the composition. For most formulations the coatings having an excellent combination of properties can be obtained by using ½ to 2 phr of the acrylic flow aid.

Generally it is advantageous to include in the thermoplastic powder coating composition an adhesion promoting polymer that is compatible with the particular cellulose acetate butyrate that is used such as an acrylic adhesion promoter. One such acrylic adhesion promotor that has been found to give good results is marketed under the name of ACRYLOID B44 which is an acrylic copolymer containing 80 mole percent ethyl methacrylate and 20 mole percent methyl methacrylate. The amount of adhesion promoting polymer employed can be varied substantially depending of the cellulose acetate butyrate used and the end use for which the powder coating composition is designed. Usually the amount used will fall in the range of about 0 to 15 phr.

The components of the powder coating compositions according to this invention may be mixed by dry blending in a mixer or blender (e.g., Hobart Mixer), followed by compounding in a Brabender Extruder (¾ inch) at 115°–130° C. and 50–100 rpm, granulating, cryogenically grinding and then screening to obtain a 150 mesh powder for coating. Also, the plasticizer and cellulose ester, pigment and stabilizer, if used, may be extruded at about 200° C. Alternatively, all the components may be dissolved in a solvent such as methylene chloride (at about 20 weight percent solids) and spray dried at a chamber temperature of about 50° C. by well-known techniques.

The powder compositions may be deposited on the substrate by use of a powder gun, by electrostatic deposition or by deposition from a fluidized bed or by other well-known method of powder deposition. The particle size of the powder coating composition should average between 10 and 300 microns. Preferably about 95 percent of the powder has a particle size less than 105 microns. After deposition the powder is heated to a temperature sufficient to cause its particles to flow and thus fuse together to form a smooth, uniform, continuous, uncratered coating on the substrate surface. Normally, temperatures of around 350°–425° F. are requiring for curing.

The examples which follow are submitted for a better understanding of the invention.

In the examples, the physical properties of the coatings are determined as follows:

Appearance Rating: In order to obtain appearance as a numerical value for identification, the following rating system for "orange peel" appearance and crater evaluation is used:

8 — None
7 — Trace
6 — Very slight
5 — Slight
4 — Slight to moderate
3 — Moderate
2 — Moderate to heavy
1 — Heavy
0 — Very heavy Adhesion Tape Test: Seven horizontal score lines about 1/16 inch apart are crossed with seven vertical score lines about 1/16 inch apart using a sharp razor blade to cut through the coating to the metal. Pressure sensitive tape (Scotch) is pressed down firmly over the crosshatched pattern and pulled off rapidly. The adhesion of the coating is rated:
Excellent — No coating is removed by the tape.
Good — Only small chips of coating are removed along the incisions and at intersections of the incisions.
Fair — Small chips of coating are removed in the areas between the incisions.
Poor — Substantial quantities of the coating are removed.

Adhesion Peel Test: With the edge of a sharp razor blade held perpendicular to the surface of the coating, two incisions are made through the coating to the substrate and intersecting at an angle of about 30°. An attempt then is made to insert a sharp knife edge or the equivalent between the coating and the substrate at the acute angles of the intersecting incisions and an effort is made to peel the coating from the substrate. The peel adhesion then is rated:
Excellent — Knife edge can be inserted only with difficulty or not at all; coating cannot be pulled off.
Good — Knife edge can be inserted but only small flakes of coating can be removed.
Fair — Knife edge can be inserted and moderate size flakes of coating can be removed.
Poor — Knife edge can be easily inserted and large portions of the coating between the incisions can be removed intact.

Impact Strength: Impact strength is determined by using a Gardner Laboratory, Inc., Impact Tester. A weight is dropped within a slide tube from a specified height to hit a punch having a ⅝ inch diameter hemispherical nose which is driven into the front (coated face) or back of the panel. The highest impact which does not crack the coating is recorded in inch-pounds, front and reverse.

Flexibility: The test panel is bent over a period of 15 seconds, using a Gardner Laboratory, Inc., conical mandrel of specified size, according to ASTM D-522. A pass (P) or fail (F) is recorded.

Gloss: Twenty degree and sixty degree gloss are measured using a gloss meter (Gardner Laboratory, Inc., Model GC-9095) according to ASTM D-523.

Pencil Hardness: The pencil hardness of a coating is that of the hardest pencil that will not cut into the coating. The procedure for preparing the truncated cone pencil lead and carrying out the test is given in the National Coil Coaters Association Technicao Bulletin No. II (Aug. 12, 1968). Results are expressed according to the following scale:

(softest ) 6B, 5B, 4B, 3B, 2B, B, HB, F, H, 2H, 3H, 4H, 5H, 6H (hardest)

Fusion of the Coating: Coated test panels are placed in a Freas Model 625A forced air oven and fused at a specified temperature for 10 minutes. The fused coatings are then hung on a bar to cool at room temperature.

EXAMPLES 1-4

Powder coating compositions were prepared by dry blending the components listed below, melt compounding the blend on hot rolls and cryogenically grinding the composition to less than 140 mesh powder.

| Component | Parts by Weight |
|---|---|
| CAB: acetyl = 13.5; butyryl = 37; hydroxyl = 1.5; viscosity = 0.3–0.5 | 100 |
| Titanium dioxide: R-100 | 15 |
| Adhesion Promoter: Acryloid B44 | 10 |
| Poly(propylene glycol): Molecular Weight - 1000 | 25 |
| Stabilizer: Good-rite 3114 | 0.5 |

The composition of Example 1 contained only the above ingredients. The composition of each of Examples 2, 3 and 4, in addition to the above ingredients, included, respectively, 2 phr flow aid (Modaflow), 2 phr of an epoxy resin (Epon 828), and 15 phr of inorganic filler (barium sulfate). The powder coating compositions were applied electrostatically to 20 gauge phosphatized steel panels and cured for 10 minutes in a forced air oven at a predetermined temperature. The coatings thus prepared were tested as described above. The results of the evaluation are set forth in Table 1.

In addition to the coatings on phosphatized steel, coatings of the compositions of Examples 1-4 were prepared on clean steel and aluminum.

The coatings on the three different substrates were scored as described in the above adhesion test procedures. The adhesion and delamination of the coatings were examined after immersion in water for three days. The coating of Example 1 composition exhibited fair adhesion on the phosphatized steel, excellent adhesion on cleaned steel and aluminum and delaminated slightly only on the cleaned steel panel. The coating of Example 2 exhibited good to excellent adhesion and no delamination on all three substrates. The coating of the Example 3 composition exhibited good to excellent adhesion only on aluminum and delaminated slightly only a aluminum. The Example 4 composition exhibited excellent adhesion on clean steel and aluminum and did not delaminate from any of the substrates.

EXAMPLES 5-6

Example 1 was repeated using 20 phr (Example 5) and 15 phr (Example 6) poly(propylene glycol). The results of the tests of coatings prepared from the compositions according to Example 1 are shown in Table 1. Example 6 indicates that for the particular powder coating composition used the lower limit of plasticizer is about 15 phr when high impact strength is important.

EXAMPLE 7

Example 1 was duplicated except the diacetate of the poly(propylene glycol) having a molecular weight of 1000 was used as the plasticizer and 1 phr. of Modaflow flow aid was included in the formulation. Coatings of the powder coating composition prepared were made on 20 gauge phosphatized steel panels and were tested and evaluated. The results are shown in Table 1. After immersion in water for three days, the coatings exhibited superior adhesion properties when compared to coatings prepared from a similar composition plasticized with poly(propylene glycol).

Table I

| Ex. | Fusion Temp., ° F. | Thickness Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel |
|---|---|---|---|---|---|---|---|---|---|---|---|---|
| 1 | 350 | 3.4 | 53 | 80 | 4 | 6 | >160 | 120 | 3B | G | Ex | P |
| 2 | 350 | 3.3 | 58 | 82 | 9 | 8 | >160 | 120 | 3B | G | Ex | P |
| 3 | 350 | 3.4 | 48 | 82 | 5 | 8 | >160 | 140 | 3B | G | Ex | P |
| 4 | 350 | 3.3 | 40 | 79 | 4 | 5 | >160 | 130 | 3B | G | Ex | P |
| 5 | 375 | 3.7 | 67 | 84 | 7 | 6 | 140 | 140 | 2B | G | Ex | P |
| 6 | 375 | 3.5 | 71 | 86 | 6 | 6 | 70 | 20 | B | G | Ex | P |
| 7 | 375 | 3.6 | 71 | 88 | 8 | 8 | >160 | >160 | — | G | Ex | P |

Although the invention has been described in considerable detail with particular reference to certain preferred embodiments thereof, variations and modifications can be effected within the spirit and scope of the invention.

I claim:

1. A composition comprising an ester of cellulose and one or more carboxylic acids of two to four carbon atoms and a plasticizing amount of (1) poly(tetramethylene glycol) having a molecular weight of about 800 to 1200, (2) a poly(alkylene glycol) copolymer in which 10 weight percent or less is made up of units derived from ethylene oxide and the remainder is made up of units derived from propylene oxide, the copolymer having a molecular weight of about 800 to 1200, (3) poly(propylene glycol) having a molecular weight of about 800 to 1200, or (4) a carboxylic acid ester of (1), (2), or (3) in which the carboxylic acid moiety contains about 2 to 8 carbon atoms.

2. A composition according to claim 1 wherein the plasticizing amount is about 5 to 30 phr.

3. A composition according to claim 1 comprising an ester of cellulose and one or more carboxylic acid of two to four carbon atoms and about 7.5 to 30 phr. of (a) poly(propylene glycol) having a molecular weight of about 1000, or (b) the diacetate ester of (a).

4. A composition according to claim 3 wherein the ester is cellulose acetate, cellulose acetate propionate or cellulose acetate butyrate.

5. A composition according to claim 1 comprising cellulose acetate butyrate and a plasticizing amount of (1) poly(tetramethylene glycol) having a molecular weight of about 800 to 1200, (2) a poly(alkylene glycol) copolymer in which 10 weight percent or less is made up of units derived from ethylene oxide and the remainder is made up of units derived from propylene oxide, the copolymer having a molecular weight of about 800 to 1200, (3) poly(propylene glycol) having a molecular weight of about 800 to 1200, or (4) a carboxylic acid ester of (1), (2) or (3) in which the carboxylic acid moiety contains about 2 to 8 carbon atoms.

6. A composition according to claim 5 wherein the cellulose acetate butyrate has a viscosity of about 0.2 to 40 seconds, a acetyl content of about 2 to 30 percent, a butyryl content of about 17 to 53 percent and a hydroxyl content of about 0.5 to 2.7 percent and the plasticizing amount is about 5 to 30 phr.

7. A composition according to claim 5 wherein the cellulose acetate butyrate has a viscosity of about 0.2 to 40 seconds, an acetyl content of about 2 to 30 percent, a butyryl content of about 17 to 53 percent, and a hydroxyl content of about 0.5 to 2.7 percent and the compositions contains 5 to 30 phr. of (a) poly(propylene glycol) having a molecular weight of about 1000, or (b) the diacetate ester of (a).

8. A thermoplastic coating composition in the form of a powder having an average particle size of between about 10 and 300 microns in which the film-forming ingredient consists essentially of a cellulose acetate butyrate wherein the plasticizer is (1) poly(tetramethylene glycol) having a molecular weight of about 800 to 1200, (2) a poly(alkylene glycol) copolymer in which 10 weight percent or less is made up of units derived from ethylene oxide and the remainder is made up of units derived from propylene oxide, the copolymer having a molecular weight of about 800 to 1200, (3) poly(propylene glycol) having a molecular weight of about 800 to 1200, or (4) a carboxylic acid ester of (1), (2) or (3) in which the carboxylic acid moiety contains about 2 to 8 carbon atoms.

9. A composition according to claim 8 wherein the plasticizer is (a) poly(propylene glycol) having a molecular weight of about 1000, or (b) the diacetate ester of (a), and the plasticizer is present in a concentration of about 5 to 30 phr.

10. A composition according to claim 8 wherein the cellulose acetate butyrate has a viscosity of about 0.3 to 2.0, an acetyl content of about 10 to 15 percent, a butyryl content of about 35 to 40 percent and wherein the plasticizer is poly(propylene glycol) or poly(propylene glycol) diacetate present in a concentration of about 5 to 30 phr.

11. A thermoplastic coating composition in the form of a powder having an average particle size of between about 10 and 300 microns in which the film-forming ingredient consists essentially of a cellulose acetate butyrate having a viscosity of about 0.3 to 0.5 seconds, an acetyl content of about 13.5 percent, a butyryl content of about 37 percent and a hydroxyl content of about 1.5 percent wherein the plasticizer is (a) poly(propylene glycol) having a molecular weight of about 1000, or (b) the diacetate ester of (a) in a concentration of about 7.5 to 25 phr.

* * * * *